United States Patent [19]
Marshall et al.

[11] Patent Number: 5,982,789
[45] Date of Patent: *Nov. 9, 1999

[54] PULSED LASER WITH PASSIVE STABILIZATION

[75] Inventors: Larry R. Marshall, Sunnyvale; Wayne E. Kelsoe; David M. Buzawa, both of San Jose, all of Calif.

[73] Assignee: Light Solutions Corporation, Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/865,508

[22] Filed: May 30, 1997

Related U.S. Application Data

[63] Continuation-in-part of application No. 08/562,297, Nov. 22, 1995, Pat. No. 5,663,979.
[60] Provisional application No. 60/015,870, May 31, 1996.

[51] Int. Cl.⁶ .................................................... H01S 3/10
[52] U.S. Cl. ................... 372/22; 372/34; 372/25; 372/33
[58] Field of Search ................... 372/22, 34, 25, 372/33; 359/326, 328

[56] References Cited

U.S. PATENT DOCUMENTS

| | | | |
|---|---|---|---|
| 3,982,201 | 9/1976 | Rosenkrantz | 372/75 |
| 4,035,742 | 7/1977 | Schiffner | 331/94.5 |
| 4,272,733 | 6/1981 | Walling et al. | 372/41 |
| 4,383,318 | 5/1983 | Barry et al. | 372/6 |
| 4,553,238 | 11/1985 | Shaw et al. | 372/66 |
| 4,567,598 | 1/1986 | Noguchi et al. | 372/36 |
| 4,653,056 | 3/1987 | Baer et al. | 372/27 |
| 4,656,635 | 4/1987 | Baer et al. | 372/27 |
| 4,710,940 | 12/1987 | Sipes | 372/75 |

(List continued on next page.)

OTHER PUBLICATIONS

Anthon, D. et al., "Stable Multilongitudinal–Mode Operation of a Diode–Pumped Twisted–Mode Intracavity Doubled Nd: YAG Laser", *CLEO '90,* Wednesday May 23, CWC3, p. 232 (1990).

Baer, T., "Large–Amplitude Fluctuations Due to Longitudinal Mode Coupling in Diode–Pumped Intractivity–Doubled Nd: YAG Lasers", *J. Opt. Soc. Am.,* vol. B3, pp. 1175–1180 (1986).

Beach, R. et al., "Frequency Doubled Operation of a Ground State Depleted laser Using the $Nd^{3+4}F_{3/2}-{}^4I_{9/2}$ Transition in $Y_2SiO_5$", *CLEO '90,* Wednesday May 23, CWC6, p. 234 (1990).

(List continued on next page.)

Primary Examiner—Leon Scott, Jr.
Attorney, Agent, or Firm—Lahive & Cockfield, LLP

[57] ABSTRACT

A diode pumped doubling system employs a pump diode, a crystal and doubler in a laser cavity with the diode and is operated in a pulsed or low duty cycle pumping regimen, while the cavity length is sufficiently short to stabilize the transient responses to pulsed diode operation and produce stable and known or controlled energy output under the non-CW pumping regimen. The construction allows stable output to be maintained with much looser temperature control, and to be achieved during the initial turn-on interval of the laser diode. In a preferred embodiment, the device employs a doubler which is clamped across its non-critical axis, and is operated with a control system which creates isotherms in the active mode volume. The controller operates one or more separate heat sources and/or sinks to preheat the diode source or doubling crystal to maintain an oriented thermal gradient, and the rate or direction at which the isotherm migrates across the mode volume is controlled in accordance with the forthcoming pulse sequence to maintain effectively stable conditions during laser operation. The thermal control system may include sink, heater and control elements for pre-heating the laser diode before actuation, and during quiet intervals.

23 Claims, 7 Drawing Sheets

OTHER PUBLICATIONS

Berger, J. et al., "Fiber Bundle Coated, Diode End–Pumped Nd: YAG Laser", *Optics Letters,* vol. 13 (4), pp. 306–308 (1988).

Burnham, R. et al., "High–Power Diode–Array–Pumped Frequency–Doubled cw Nd: YAG Laser", *Optics Letters,* vol. 14 (1), pp. 27–29 (1989).

Chinn, S., "Intractivity Second–Harmonic Generation in a Nd: Pentaphosphate Laser", *Applied Physics Letters,* vol. 29 (3), pp. 176–179 (1976).

Conant, L. et al., "GaAs Laser Diode Pumped Nd: YAG Laser", *Applied Optics,* vol. 13 (11), pp. 2457–2480 (1974).

Cunningham, R., "Adventures in the Blue and Green", *Lasers And Optronics,* pp. 31–33, Apr. (1994).

DiFonzo, S. et al., "Laser Power Stabilization by Means of Internal Second Harmonic Generation", *Optics Communications,* vol. 71 (5), pp. 295–300 (1989).

Dixon, G., "Frequency–Doubling Schemes Turn CW DPL's into Visible Sources", *Laser Focus World,* pp. 99–107 (1990).

Fan, T. et al., "Diode Laser–Pumped Solid State Lasers", *IEEE Journal of Quantum Electronics,* vol. 24 (6), pp. 895–912 (1988).

Gerstenberger, D. et al., "High Peak Power Operation of a Diode–Pumped Q–Switched Nd: YAG Laser", *Optics Letters,* vol. 15 (2), pp. 124–126 (1990).

Hanson, F. et al., "Laser Diode Side Pumping of Neodymium Laser Rods", *Applied Optics,* vol. 27 (1), pp. 80–83 (1988).

Hong, J. et al., "Diode Laser Array Pumped Q–Switched Nd: YAG Laser Operating at 946 nm", *CLEO '90,* Wednesday May 23, CWC7, pp. 234 (1990).

International Search Report, Issued Sep. 19, 1997 corresponding to PCT/US97/09601.

James, G. et al., "Elimination of Chaos in an Intracavity–Doubled Nd: YAG Laser", *Optic Letters,* vol. 15 (20), pp. 1141–1143 (1990).

Jeys, T., "Suppresion of Laser Spiking by Intracavity Second Harmonic Generation", *Applied Optics,* vol. 30 (9), pp. 1011–1013 (1991).

Kasinski, J. et al., "One Joule Output From a Diode–Array–Pumped Nd: YAG Laser with Side–Pumped Rod Geometry", *IEEE Journal of Quantum Electronics,* vol. 28 (4), pp. 977–985 (1992).

Kaz, A. et al., "Continous Wave Diode–Pumped Lasers and Parametric Oscillators", *CLEO '93,* Wednesday May 5, CWD1, p. 244 (1993).

Keyes, R. et al., "Injection Luminescent Pumping of $CaF_2:U^{3+}$ with GaAs Diode Lasers", *Applied Physics Letters,* vol. 4 (3), pp. 50–52 (1964).

Kintz, G. et al., "Single–Frequency Operation in Solid–State Laser Materials with Short Absorption Depths", *IEEE Journal of Quantum Electronics,* vol. 26 (9), pp. 1457–1459 (1990).

Kubodera, K. et al., "Pure Single–Mode $LiNdP_4O_{12}$ Solid–State Laser Transmitter for 1.3–$\mu$m Fiber–Optic Communications", *Applied Optics,* vol. 21 (19), pp. 3466–3469 (1982).

MacKinnon, N. et al., "Ultra–Compact, Laser–Diode–Array–Pumped, $Nd:Yvo_4$/KTP, Frequency–Doubled, Composite–Material Microchip Laser", *CLEO '94,* Tuesday May 10, CtuP1, p. 156 (1994).

Marshall, L. et al., "Intracavity Doubled–Mode–Locked and CW Diode–Pumped Lasers", *IEEE Journal of Quantum Electronics,* vol. 28 (4), pp. 1158–1163 (1992).

Marshall, L. et al., "An Efficient Eyesafe Source at 1.59 Microns", *OSA Proceedings on Advanced Solid–State Lasers,* vol. 6, pp. 271–273 (1990).

Nightingale, J. et al., "0.6 Stable, Single–Frequency, Green Laser", *OSA Proceedings of Compact Blue–Green Lasers Topical Meeting,* Feb. 10–11, Salt Lake City, UT, pp. PD61–PD64 (1994).

Oka, M. et al., "Laser Diode Pumped 1–W Green Laser", *CLEO '90,* Wednesday May 23, CWC4, pp. 232–234 (1990).

Oka, M. et al., "Stable Intracavity Doubling of Orthogonal Linearly Polarized Modes in Diode–Pumped Nd: YAG Lasers", *Optics Letters,* vol. 13 910), pp. 805–807 (1988).

Pinto, J. et al., "Suppression of Spiking Behavior in Flash-pumped 2–$\mu$m Lasers", *IEEE Journal of Quantum Electronics,* vol. 30 (1), pp. 167–169 (1994).

Product Literature for High Power Diode Lasers, Opto Power Corporation.

Product Literature for SDL 3400/6400/7400–P5/P6 Series, SDL Inc.

Rosenkrantz, L., "GaAs Diode–Pumped Nd: YAG Laser", *Journal of Applied Physics,* vol. 43 (11), pp. 4603–4605 (1973).

Schutz, I. et al., "Self–Frequency Doubling Nd: YAB Laser Pumped by a Diode Laser", *CLEO '90,* Wednesday May 23, CWC4, p.232 (1990).

Smith, R. et al., "100 mW Laser Diode Pumped Nd: YAG Laser", *SPIE Advances in Laser Engineering and Applications,* vol. 247, pp. 144–148 (1980).

Taira, T. et al., "Single–Mode Oscillation of Laser–Diode–Pumped Nd: $YVO_4$ Microchip Lasers", *Optics Letters,* vol. 16 (24), pp. 1955–1957 (1991).

Zhou, B. et al., "Efficient, Frequency–Stable Laser–Diode–Pumped Nd: YAG Laser", *Optics Letters,* vol. 10 (2), pp. 62–64 (1985).

PULSED LASER WITH PASSIVE STABILIZATION

REFERENCE TO RELATED APPLICATIONS

This application claims the benefit of United States Provisional Application 60/015,870 filed on May 31, 1996 and is a continuation-in-part of U.S. patent application Ser. No. 08/562,297 filed on Nov. 22, 1995, now U.S. Pat. No. 5,663,979.

TECHNICAL FIELD

This application relates generally to laser sources, and in particular to diode-pumped frequency doubled laser sources.

Applicant's earlier U.S. Pat. No. 5,511,085 describes such a laser source which operates continuous wave, and identifies a number of prior art publications relevant to construction and operation of these devices. That patent is hereby incorporated herein by reference for its description of a number of effective frequency doubling laser system configurations, its review of the general prior art, as well as for its disclosure of a passive stabilization technique which was shown to greatly enhance stability of the wavelength conversion process.

In general, the prior art pumped doubling systems employ active temperature stabilization of the doubling crystal, of any intracavity waveplates or etalons, and usually of the laser crystal itself in order to achieve a sufficiently stable output. Without strict temperature control the systems may be poorly behaved. Slight changes in birefringence, caused for example by misalignment of the doubling crystal, result in output instabilities. The lasers may be forced to run single-longitudinal mode in one or both of two orthogonally polarized directions to obtain beam power stability, thus requiring a number of additional components in the cavity. In general, doubling systems are much more sensitive to component quality than are other systems. What is needed is a passively stabilized laser that does not require tight temperature control or multiple intracavity elements, a laser which is robust and insensitive to vibration.

Many practical applications of CW green lasers require intermittent operation. For example, among medical applications, commonly necessary photocoagulation procedures require that the green source be "pulsed", typically with a pulse duration of one to five hundred milliseconds. The intervals are generally selected to achieve a particular tissue temperature over a specified depth, and this temperature distribution is determined by factors such as the tissue thermal conductivity and absorbance (which are known) and the laser output power, which must be controlled. In this pulsed mode of operation, the laser output is therefore required to be stable; quasi-Q-switching or spiking behaviors, with their extreme variations of energy, could be harmful. For example such spiking operation could cause damage to the eyes of the patient in a retinal coagulation procedure. The prior art techniques for maintaining output stability all rely on stringent temperature control. However it is not possible to achieve static temperature of the doubling crystal when the fundamental laser output is to be pulsed, because the light passing through the crystal causes local heating. In a typical pulse, the doubling crystal and laser crystal temperatures might rise by as much as 30° C. Even if the temperature rise is not this great during a single pulse, repetitive pulsing of the laser in an "on demand" fashion will cause a steady increase in temperature. As a result the doubled output will exhibit widely varying stability characteristics. Anthon has shown that a temperature excursion of only 0.1° C. is sufficient to destabilize doubled output.

As a result, in order to achieve a suitable output from a diode-pumped intracavity doubling laser, one generally has to operate the laser at constant power and allow it to stabilize. Because sudden changes in diode temperature, thermal lensing, or doubling crystal temperature cause instabilities in the laser, if one requires "green on demand" performance, one would have to run the laser continuously and shutter the output. This would result in substantial heating and power consumption, so such a device would be a poor commercial competitor to existing ion lasers.

Another set of medical applications, the ablation or coagulation procedures used in dermatology, require a controlled dose of light to be delivered in a time that is short compared to the thermal relaxation time of tissue. These time intervals are so short that if the laser output is chaotically fluctuating it will not be possible to even approximate an average output power or an average "delivered thermal energy" during the pulse interval, making it impossible to achieve a controlled dose.

Further, in industrial applications such as marking or printing, the ability to turn the laser on and off rapidly—and to know that a specified power is achieved in a pulse interval—would be advantageous. If such operation were achieved, the laser beam could make a mark, be shut off, moved to point at a different location, and then re-initiated to mark the new location.

The ability to pulse a solid state laser could also be used to significantly improve laser performance and simplify manufacture in several respects. Effects such as thermal birefringence and lensing are greatly reduced in CW pumped lasers if the duty cycle can be reduced. For example, in a ten per cent duty cycle operation requiring one Joule of laser light to be delivered over a tenth of a second, the average output power would be one watt, while the equivalent CW laser power would be ten watts. The thermal effects present in a ten watt CW laser would be ten times greater, making it a more difficult device to produce.

An array of diodes end pumping a solid-state laser can be pulsed at a rate sufficient to induce CW operation, as described, for example in Rosenkranz U.S. Pat. No. 3,982,201, and the diode light may be collected either by low f-number optics or optical fibers. Applicant has previously described, in U.S. Pat. No. 5,511,085, a passive stabilization technique which does not require temperature stabilization to produce stable wavelength-converted output from the solid-state laser. According to that technique, by using a sufficiently short lasing cavity to achieve a high mode-beating frequency, spiking behavior causes the efficiency of the wavelength conversion process to be increased. Since the laser will always operate in the mode that minimizes its loss (in this case the wavelength doubling, which passes out of the cavity as output power), shortening the cavity suppresses spiking: the laser therefore operates without spiking and the output remains stable.

As noted above, for many practical applications, such as retinal photocoagulation, green light is the optimal portion of the spectrum for effective treatment, and the design of a diode-pumped green laser for such medical applications is therefore a highly desirable goal. However, practical implementation of such a laser, one capable of accurately performing the necessary range of pulsed exposure treatment protocols developed in various branches of medicine and surgery, remains incomplete, or suffers from certain operational constraints which prevent a diode-pumped architecture from fully competing with other better developed, but more costly, conventional constructions.

Various recent advances have been reported in the literature, such as a two watt CW green laser that operates from a single phase domestic line power source, and a five watt cw green laser for pumping applications that has demonstrated a significant noise reduction over ion laser sources.

The biggest impediment to successful development of diode-pumped green lasers has been the "green problem," first analyzed by Tom Baer (*J Opt. Soc. Am.*, B3, 1175 (1986)). Baer showed that severe amplitude fluctuations occurred in intracavity doubled lasers due to longitudinal mode coupling. In diode-pumped systems this was an especially severe problem because of the tendency of these lasers to oscillate on few longitudinal modes. The Spectra Physics company found one solution to the green problem in diode-pumped systems by lengthening the laser cavity to allow a large number, about one hundred, longitudinal modes to oscillate simultaneously, thus significantly reducing the amplitude of the mode-coupling noise. Their long-cavity diode pumped source was manufactured as a "plug-in" replacement for ion lasers up to about five watts in power, that was embodied in a unit about the same size as an ion laser due to the one meter cavity length required, but was much more efficient and therefore required only a small liquid cooler. Applicant's U.S. Pat. No. 5,511,085 describes another approach to stabilizing the doubled green output of a pumped systems, and more recently, applicant's U.S. patent application Ser. No. 08/562,297 filed Nov. 22, 1995 has described an intracavity doubler that substantially relaxes alignment constraints for high power CW diode pumping. All of these advances have improved the prospect of ultimately constructing a useful robust, dependable diode-pumped green doubling system for medical applications.

However, despite these advances, the ion laser is still widely accepted, and one manufacturer continues to sell over a thousand ion lasers per year for use in photocoagulators alone. Like gas laser tubes, ion lasers are now a well developed technology that is inexpensive to mass-produce. Small-frame one watt ion lasers do not need chillers, unlike their solid-state competitors. One such photocoagulator made by Coherent is about the size of a suit-bag, and has a tube life exceeding one thousand hours. Ion lasers can turn on in milliseconds, whereas diode-pumped lasers, by contrast, require significant on-time in order to stabilize, and have only recently been able to produce user-adjustable output power without de-stabilizing. This drawback stems from the fact that, although diodes can turn on very quickly, in nanoseconds or microseconds, they suffer frequency chirp due to thermal effects over a time span of tens of milliseconds when they are energized. As a result, diode-pumped lasers see a varying amount of absorbed pump power, giving rise to long turn-on transients.

In order to effectively compete with or fully replace ion laser technology, it therefore appears that a solid-state laser would have to be smaller and easier to cool, would need to operate "hands-off" without transients or adjustment, and should be significantly longer-lived. In short, to be accepted, the next generation of diode-pumped green lasers would need to be more like laser diodes themselves.

SUMMARY OF INVENTION

In accordance with one aspect of the present invention, a diode pumped doubling system employs a diode source to pump a laser crystal, which drives a doubler in the same laser cavity. The diode is operated in a pulsed or low duty cycle pumping regimen, and the cavity length is set sufficiently short to inhibit transient lasing responses to the switching of the diode input and to produce a stable and a known or controlled energy output in the pulse interval. The construction allows a much looser temperature control, and runs stably during the initial turn-on interval of the laser diode to produce a controlled dose of defined duration suitable for medical or industrial applications. In a preferred embodiment, the device is operated with a thermal control system that creates isotherms in the active volume, and preferably operates one or more separate heat sources and/or sinks to preheat the doubling crystal, create an oriented gradient or control the direction and rate of migration of an isotherm across the mode volume during intermittent operation. Preferably a heater is also applied to the diode to reduce transient ramp up.

In accordance with a further aspect of the invention, a diode-pumped laser doubling system is stabilized by its cavity parameters to lase continuously during each pulse and a coarse temperature control is applied to the doubling crystal to prevent large thermal excursions. The doubling crystal is a preferably a non-linear crystal such as KTP, LBO or BBO which is sensitive to alignment in one direction— e.g. KTP with an x-z tuning angle θ of 90° and non-critical phase matching φ in the x-y plane. The crystal is mounted and aligned in the horizontal plane, and clamped between heat source and sink on its bottom and top surfaces to establish a temperature gradient in the vertical, non-critical direction without impairing critical alignment during either clamping or directional heating. This provides an isotherm in the critical plane. The gradient is then shifted up or down, by selective actuation of the source and/or sink in coordination with the timing of the set pump pulse regimen to precondition or maintain the temperature within the horizontal doubling stratum constant within about five degrees, for a sufficiently long time and over the full range of duty cycles.

In other embodiments, the doubler may be clamped between a cooler on one surface, and both a heater and a cooler which are independently actuable on its other surface. The independently actuable thermal elements are then actuated in a sequence to create a thermal dip or a sloped gradient across the doubling stratum. During pulse actuation, the heat internally generated at the center then complements the initial thermal distribution to enhance or extend the uniformity of its temperature. The thermal elements may be switched to a cross bias mode during or just prior to initiation of the pulse sequence, so that heat arising in the center migrates more quickly outward, so that the center is only minimally perturbed during an extended interval as the distribution peaks. Preferably the diode itself is preheated by an amount effective to sharpen its rise time and enhance its efficiency during pulse initiation, giving the doubled output a better defined leading edge shape.

BRIEF DESCRIPTION OF THE DRAWINGS

These and other features of the invention will be understood from the description herein of its theory of operation, taken together with the drawings and a discussion illustrating illustrative practical embodiments thereof, wherein.

DETAILED DESCRIPTION

Figure 1:
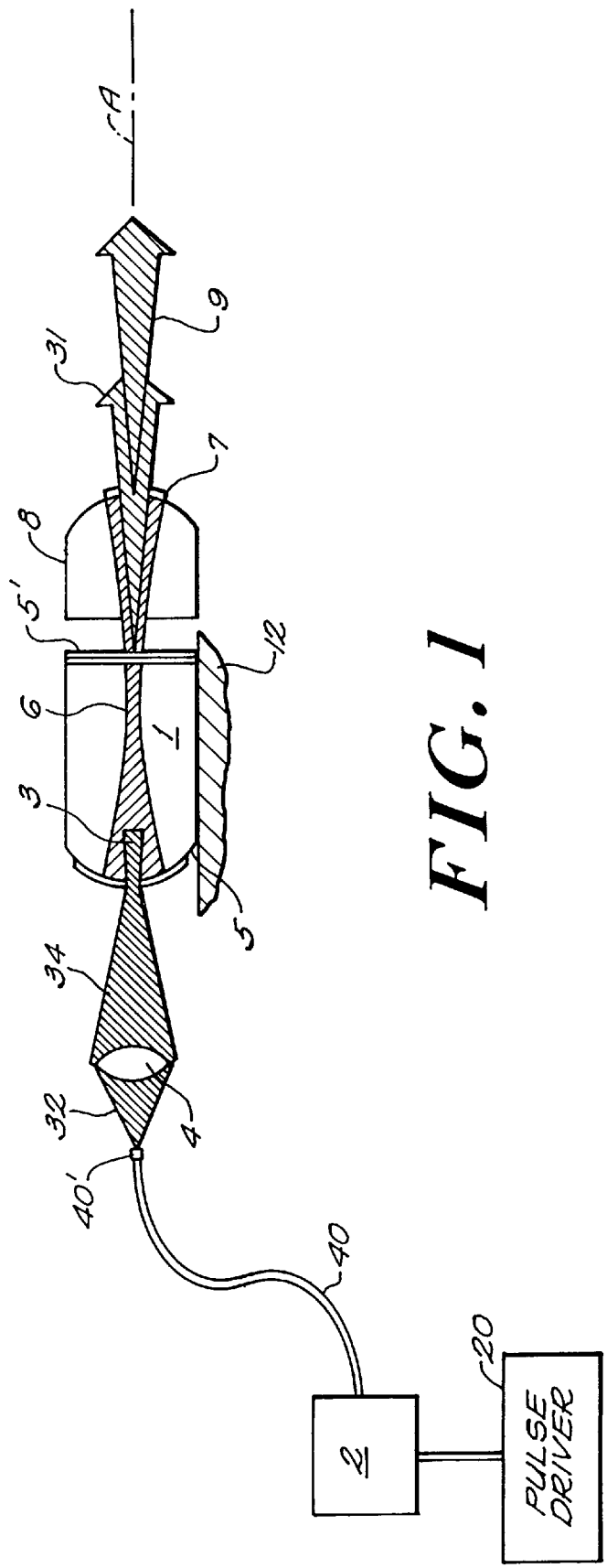
FIG. 1 illustrates a first embodiment of the present invention.

FIG. 1 shows one embodiment of the system of the present invention, in which a laser rod or crystal 1 is pumped by a laser diode array. The diode array 2 is coupled via an optical fiber or fiber bundle 40 to an output coupler 40' which provides a defined diode output beam 32. An optical assembly 4, which may include one or more lenses, focuses and directs the incident beam 32 as a shaped pumping beam 34 onto an entry end face 5 of the crystal 1. In the illustrated embodiment, the laser crystal 1 is end-pumped by the fiber-coupled diode array; that is, the pump radiation is directed along the same axis as that along which the laser crystal 1 emits fundamental radiation. The fiber coupling simply bundles the outputs from many diodes and allows the pump laser array 2 to have a high degree of flexibility in package design, yet achieve precise alignment with respect to the input optics 4. This much of the illustrated diode pump construction is similar to that reported, for example, by K. Kubodera and J. Noda, in Appl. Opt. vol. 21 (1982) pp. 3466, and the system shown in FIG. 1 of applicant's own earlier U.S. Pat. No. 5,511,085. The diode power may alternatively be directly aimed at the end face 5, as described in applicant's earlier U.S. patent application Ser. No. 08/562,297 filed Nov. 22, 1995, in which case a fiber bundle or light pipe array may be used without intervening coupling optics to illuminate a region of the face 5. As shown, the pump beam is largely absorbed within a short distance of it's entry point. As further shown in the FIGURE, a pulse driver 20 provides one or more electrical pulses of short duration, which vary with the particular application in a manner discussed more fully below, to power the diode array 2 and thus turn the pump beam ON and OFF; thus it does not run continuously. The present invention is directed to a construction that achieves stable operation despite the transient states and unstable effects normally expected in such discontinuous operation of the diode source.

With further reference to FIG. 1, the pumping beam 34 is directed into a small gain region 3 in the crystal 1 and excites the emission of a fundamental laser beam 6. The beam 6 passes along axis A and through the front face 5' of the crystal 1 into a second crystal or medium which is a non-linear optical element 8. This element 8 converts the fundamental beam into a final output beam of higher frequency, such as a frequency-doubled or second harmonic beam, that exits as the illustrated beam 9. At the far, i.e., rightmost, end of the non-linear element 8, a mirror 7 reflects energy at the fundamental frequency of beam 6, i.e., reflects the beam 6 energy which was not converted to the doubled frequency, so that it again traverses the element 8 and crystal 1, first in a right-to-left direction and then back, from the face 5, toward the right. This re-traversed energy then is converted in the non-linear element 8 to the second harmonic, and exits as additional second harmonic power, illustrated as beam 31, which augments the single-pass converted power in beam 9.

The back face 5 of the laser crystal 1 at which the diode pump light enters is coated to transmit the incident diode radiation of beam 34 and to totally reflect the beam of fundamental laser radiation 6 which is generated by the laser crystal in response to the diode pumping. The front face 5' of the laser rod, or crystal 1 is anti-reflection coated at the fundamental laser wavelength, allowing the fundamental light generated in crystal 1 to pass directly to the non-linear doubling crystal 8. The back face 5 of the laser crystal 1 and the mirror 7 thus define an optical cavity containing both the crystal 1 and nonlinear doubling element 8. The mirror 7 is highly transmitting at the second harmonic wavelength, i.e., one-half the fundamental wavelength, which therefore passes as output energy from the cavity.

Several additional preferred properties of the features of the embodiment of FIG. 1 are discussed more fully in applicant's earlier U.S. Pat. No. 5,511,085 and will be briefly mentioned here. Among these features, front face 5' of the crystal 1 is preferably coated to be highly reflecting at the doubled wavelength so that the backward pass of doubled light (i.e., frequently-doubled light emitted in the non-linear element 8 and propagating toward the laser crystal 1) is reflected 180° to form a doubled beam 31 traveling in the output direction, i.e., left to right, thus augmenting the doubled beam 9. This construction and operation reduces absorption of doubled light by the laser crystal 1, which might otherwise generate significant heat. Another such feature, indicated by the multi-layer depiction of front face 5' in FIG. 1, is a construction whereby the reflective surface at this position—either coated on face 5' or separately positioned and rigidly aligned therewith—is aligned to constitute, together with the back mirror 5, an intracavity etalon which limits the number of longitudinal cavity modes. If coated directly on the crystal face 5' such coating makes crystal 1 into a monolithic etalon, and produces high stability of the etalon mirror alignment. It is also contemplated that the solid-state laser system of FIG. 1 may be pumped with other sources of pump light, and may also be used with other types of intracavity non-linear crystal, in addition to frequency doubling crystals. For example, an intracavity optical parametric oscillator, as disclosed in U.S. Pat. No. 5,181,255, can be stabilized in accordance with constructions of the present invention. However, for clarity of exposition, the discussion below focuses on basic embodiments of a laser diode-pumped laser system with an intracavity frequency doubler, rather than on the generally more complex systems that have other non-linear crystal components, or other pump sources.

According to a principal aspect of the present invention, the pulsed diode-pumped laser is stabilized during intermittent operation by setting the cavity length short enough, for example, in the range of one to three centimeters, to smooth the fundamental light beam during diode transient operation. In further aspects, the stability of the diode, of the doubler or both are further enhanced by preheating or thermal gradient conditioning, which advantageously may further be tailored and synchronized to the next pilse sequence. These features and structures for achieving such operation will be described further below, following a discussion of the factors giving rise to transient instabilities in the prior art.

In general it will be appreciated that when a diode is switched ON, a heating of the lasing medium will start that produces relaxation oscillations and start up transients as the diode cavity changes length and successively lases in different modes producing a chirp spanning a 10–20 nanometer increase in wavelength. When this transient burst is used as a pump beam, the fundamental output from the pumped laser crystal will generally increase or decrease in power as the pump power rises and dips, but also suffer in efficiency as the diode light starts or moves outside the narrower absorption band of the crystal. A temperature change of 20° C. in the diode may introduce a wavelength shift of 6 nm, greatly above the 2–3 nm crystal gain band width. By inserting a lossy element in the cavity, the amplitude of the output swings may be reduced, but the cirped spiking remains of sufficient magnitude to grossly distort the average power output, and during the initial rise time of the diode the crystal output may be greatly below the intended value. A comparison of time scales is instructive. Laser diodes can be pulsed with rise times in the nanosecond regime, but the diode output exhibits chirp of tens of milliseconds. In a typical laser diodes, the junction temperature can be tens of degrees higher than the base temperature when the diode is operating. The junction temperature also rises when a diode is pulsed, even if the base temperature is held constant; this rise in temperature causes a red-shift in diode wavelength, typically over a 10–30 ms time interval, depending on the diode package.

When used to pump an intracavity doubling system, other aspects of heating must also be considered for the other elements of the system. In pure CW operation, the doubling crystal experiences an increase in temperature due to small but finite absorption of the intracavity flux. In typical operation at the 2 W green level, the doubling crystal may reach 60° C. temperature when there is good heat sinking of the crystal. When the laser is operated in a pulsed mode at say 10% duty cycle, the crystal temperature is much closer to ambient (say 30° C.). Therefore, the doubling crystal can experience a 30° C. temperature excursion simply because of changes in the duty cycle of operation, and this temperature change can alter the phase-matching angles of the doubler through refractive index changes, resulting in reduced doubling efficiency.

In intracavity-doubled lasers, the coupling between doubling of an individual longitudinal mode, and sum mixing of adjacent longitudinal modes causes instabilities. Rather than simply causing mode beating, the coupling can plunge the laser into relaxation oscillations causing quasi-Q-switching behavior. This instability of a green doubled output is shown in the upper oscilloscope trace of FIG. 2. The trace shows the typical output of an intracavity doubled diode-pumped Nd:YAG laser, when no efforts are made to control crystal temperature or mode structure. The output is chaotically unstable, looking rather like a random collection of relaxation oscillations. The output power in this mode of operation is significantly higher than for true CW operation, depleting the necessary population of excited states so this mode is unstable and frequently hops into quasi-stable states of lower output power. Relaxation oscillations occur in solid-state lasers due to the energy storage capability of lasers which imparts a time lag between a change in operating conditions and the resulting change in laser flux.

Figure 2:
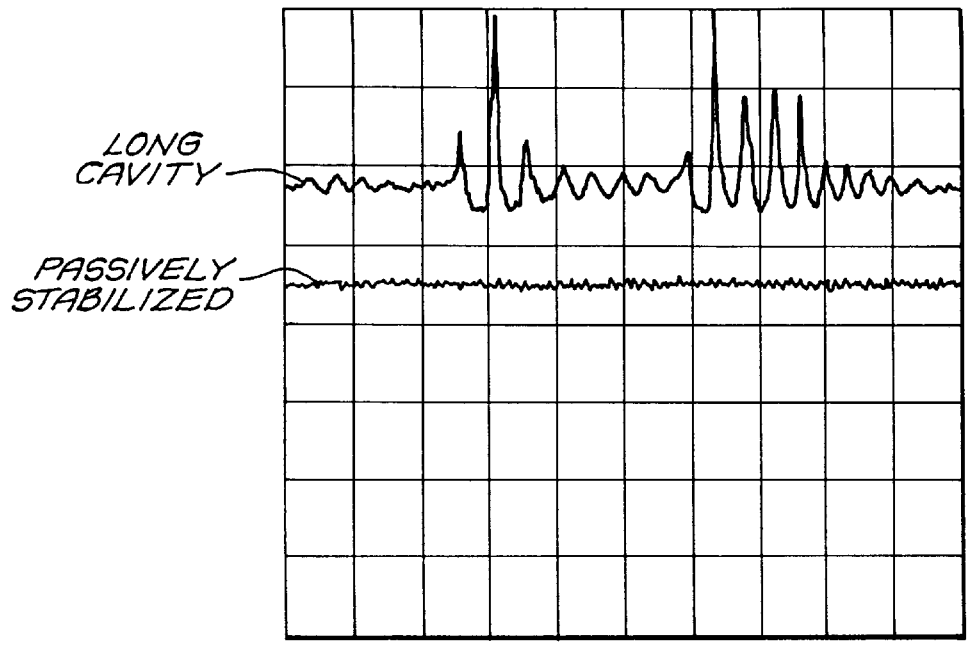
FIG. 2 shows a comparison of doubled output in accordance with the present invention and output of the prior art during pulsed operation.

To solve a similar stability problem, the "green problem" applicant has previously proposed, in the aforesaid '085 patent, reducing cavity length to increase the spiking frequency and employing a doubler or non-linear element that operates more efficiently at higher intensities of pump radiation, a construction in which the laser sees the intracavity doubled output as a source of loss, and minimizes this loss. Lowest green output power is then achieved for stable CW operation, forcing the laser to preferentially lase only in this mode. In that technique, the laser effectively quenches or inhibits spiking operation and runs in a CW mode. The bottom oscilloscope trace of FIG. 2 shows such operation. This approach achieves higher power, quasi-CW green output in applications that do not require stability on short time scales.

Applicant has now found that a related construction is effective to stabilize output power even on the very short time scales involved in pulsed diode operation, and even when the source of spike-like perturbations lies the initial chirps and turn-on transients of pump diode light.

When the laser cavity is long, many longitudinal modes can lase under the gain bandwidth of the laser. As shown in the upper portion of FIG. 3, for a 100 mm spacing of the cavity-defining mirrors, about 10 modes lase, while for a one meter spacing the number is closer to one hundred modes (as in the Spectra-Physics design). If the cavity is shortened, the spacing of these longitudinal modes, given by c/2L (where c is the speed of light and L is the cavity length), is increased. For cavity lengths around 30 mm, only a few longitudinal modes can lase under the gain bandwidth of a Nd:YAG laser crytal. Further reduction of cavity length to around one millimeter precludes all other modes, and the laser oscillates "single-frequency." This latter case is achieved in the "microchip laser." Microchip lasers can be intracavity doubled and produce stable CW green output, a design feature which is exploited in commercial systems by the Uniphase company.

Figure 3:
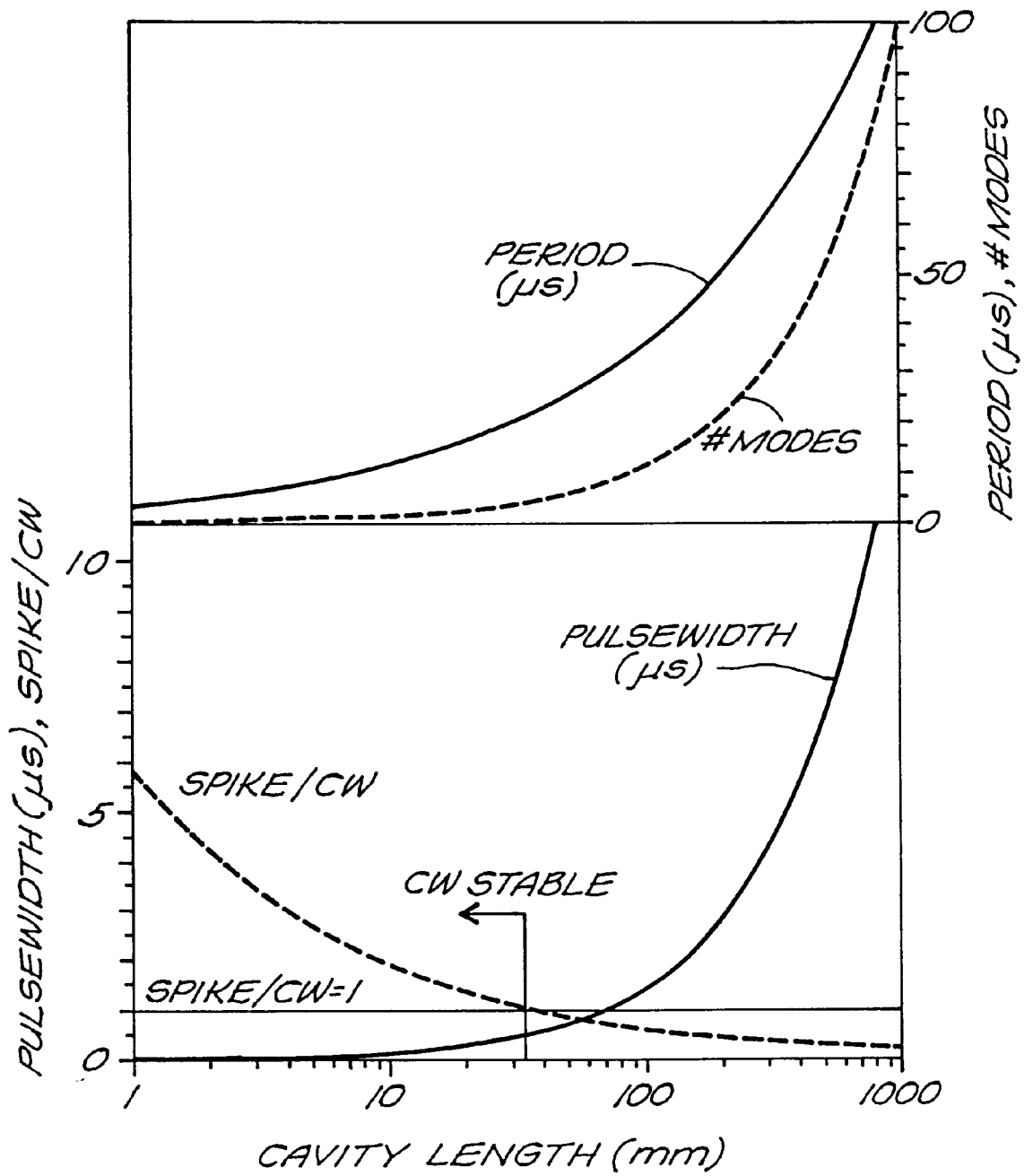
FIG. 3 illustrates spiking behavior and number of modes in relation to cavity length.

Modeling of relaxation oscillations in intracavity-doubled lasers is fairly straightforward; the upper and lower solid curves of FIG. 3 show the calculated influence of cavity length upon period and pulsewidth of the relaxation oscillations, while the upper dashed curve represents the number of longitudinal modes operating. As the cavity length is decreased, the number of longitudinal modes also decreases, and their frequency spacing becomes large. In addition, the effective cavity lifetime becomes short. The relaxation oscillations produced by a laser operating under these conditions occur at a high frequency and produce output pulses with sub-microsecond pulse lengths, as shown in the lower solid curve in FIG. 3.

Figure 4:
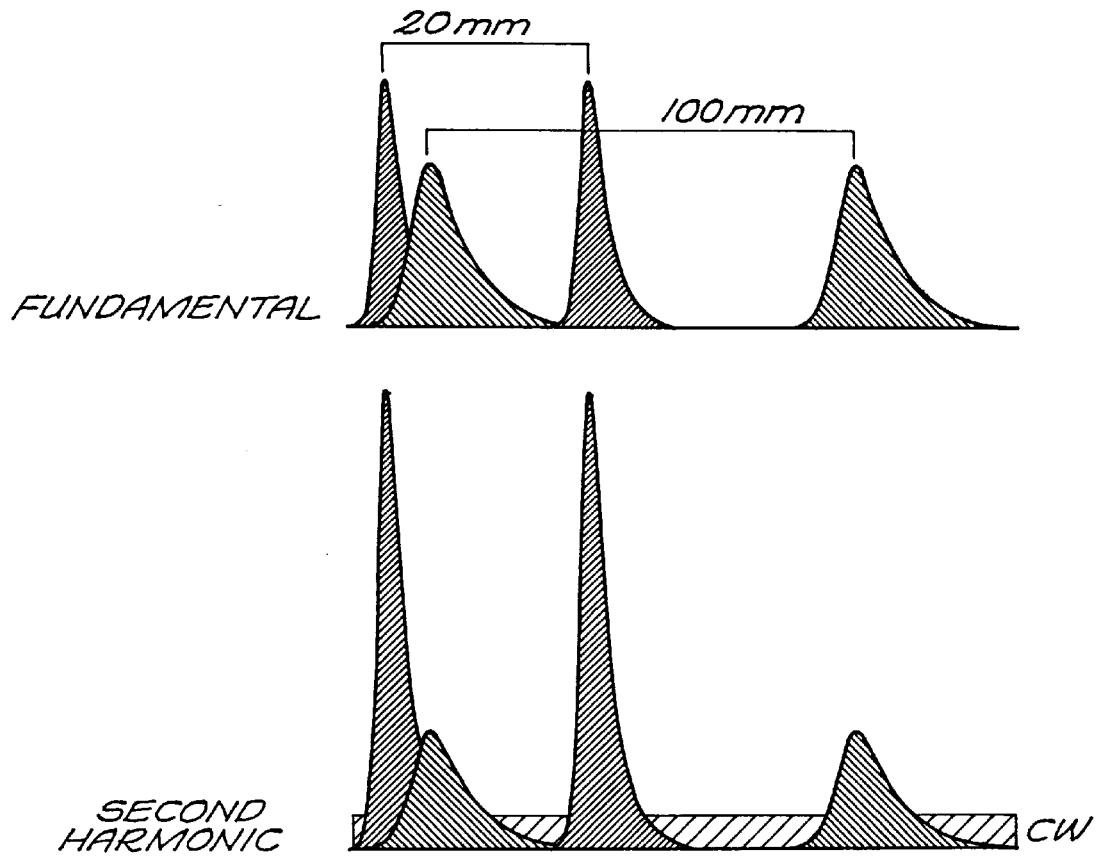
FIG. 4 illustrates doubling conversion and spiking.

As the cavity becomes even shorter, the frequency of relaxation oscillations increases while their pulse duration decreases, so that one can routinely produce green pulses shorter than 50 ns in this way. Once the duration of relaxation oscillations falls below about 100 ns, they become efficient pumps for frequency doubling. The peak conversion efficiency quickly exceeds that for pure CW operation, so that when the oscillation frequency is sufficiently high, the average green power produced by the relaxation oscillations exceeds that produced in stable CW operation. FIG. 4 graphically illustrates this dependence of doubling efficiency on the fundamental waveform. When the cavity is this short, the green output becomes stable, and little can be done to perturb it. In practice, applicant has found a cavity length below 100 mm, preferably below about 30 mm, and, most preferably in the range of 5–30 mm to be effective to stabilize an intracavity doubler pumped by a pulsed diode.

In exploring stability characteristics of a pulsed doubler stabilized in this manner, applicant has operated such a device in uncontrolled temperatures where the diode and doubling crystal temperature vary over 20° C. without de-stabilizing the CW green output. The diode power was varied from threshold to maximum, and the CW green output simply followed along substantially proportionally. Most importantly, although applicant had previously applied such stabilization to the green problem in CW lasers, transient perturbations of a type not previously considered have now been found to not destabilize the output, making this architecure suitable for producing stable output over a wide range of drive power and duty cycles, and also for producing controlled "pulses" of green light for photocoagulators.

In general, it will be understood that photocoagulation instruments operate in several possible intermittent or transient modes, each of which can involve rapidly varying doubling crystal temperature, diode wavelength, and thermal lensing effects. For all of these protocols, applicant sought to apply a controlled dose of constant green power for a selected exposure time, and then cease exposure just as rapidly as it started. For example, for direct retinal treatment it is desirable to apply laser pulses having a duration of about 100 milliseconds, while for certain dermatological procedures pulse durations under one millisecond may be called for.

Because sudden changes in diode temperature, thermal lensing, or doubling crystal temperature cause instabilities in the laser, the conventional approach for such a system would be to operate a diode-pumped intracavity doubled laser at constant power and allow it to stabilize. To achieve "green on demand" performance, one would then have to run the laser continuously and shutter the output, resulting in excessive heating and power consumption. Such a device would be a poor competitor to existing ion lasers. It is also possible to achieve "green on demand" with Q-switched lasers, simply by turning the Q-switch off and on. Additionally, Q-switching increases the green output power of the laser, making it easier to achieve the powers required for photocoagulation. Several medical companies have in fact developed Q-switched green laser products for medical photocoagulation. However, the cornea can be easily damaged by intense pulses of high peak power. In addition, acoustic shock waves can cause complications such as partial retinal detachment, so in the ophthalmic community, Q-switched lasers are now regarded with some skepticism. Thus the detailed constructions and advantages of fabrication and operation of applicant's devices described further below should be considered in relation to these two approaches of the prior art.

Figure 6:
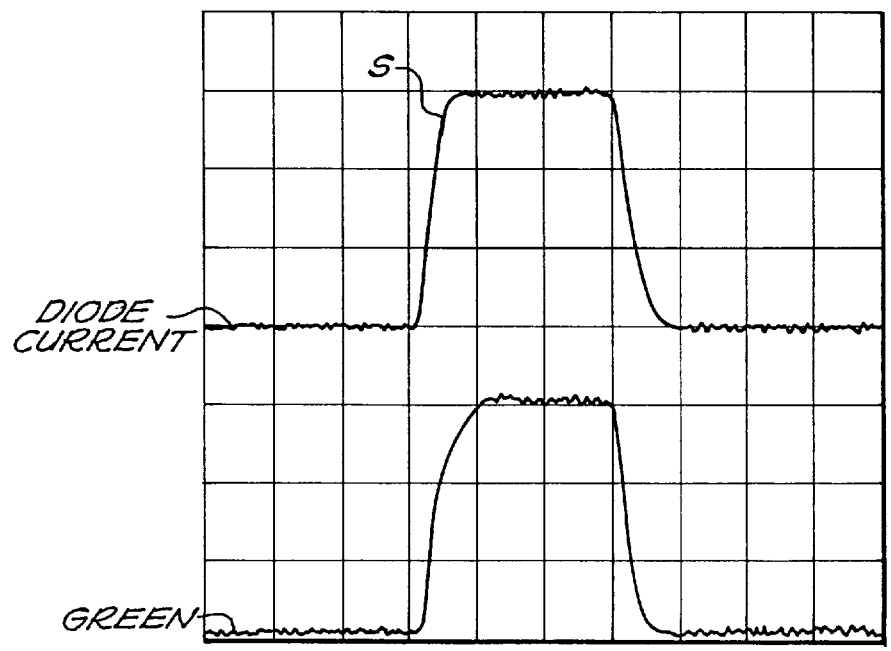
FIG. 6 shows a green output pulse of applicant's prior art passively stabilized pulsed intracavity doubled laser.

Using the passive stabilization architecture outlined above, applicant has achieved a laser output which faithfully replicates the applied diode current, and in this sense, the green laser acts more like a "green diode" than a traditional diode-pumped laser. FIG. 6 shows scope traces of an applied diode current pulse, and the green laser output generated by that current pulse. A basic embodiment depicted therein employed a comercially available diode array in a P6 package available from Spectra Diode Labs and rated at twelve watts to pump a yhree millimeter diameter YAG rod ten millimeters long and spaced about one millimeter from its bundled fiber output face, in a construction like that of FIGS. 8C–8D below. The rear face of the YAG crystal was coared to pass the 810 nm diode light and reflect the fundamental and doubled light. Output of the YAG crystal was directed at a KTP crystal about 4 mm square and 6 mm long, and the front cavity mirror was coated to form an output coupling for the 532 nm doubled light. The total cavity length was twenty millimeters. The diode-pumped green laser assembly was compact, occupying a volume of about 6"×3.5"×1.35", with a level of heat generation that allowed it to be air-cooled, and such that the entire photocoagulator system draws less electrical power than a tea kettle.

As shown in FIG. 6, the green output is not exactly linear, and the pulse shape not entirely perfect. The rising shoulder S of the diode current is reflected in a somewhat slower green turn on. This discrepancy is addressed in accordance with a further aspect of the invention by heating the diode, the doubling crystal, or both. Further performance improvements are obtained with specific doubling materials and the application of dynamic heat profiles, described with reference to FIG. 7A et seq below.

Figure 5:
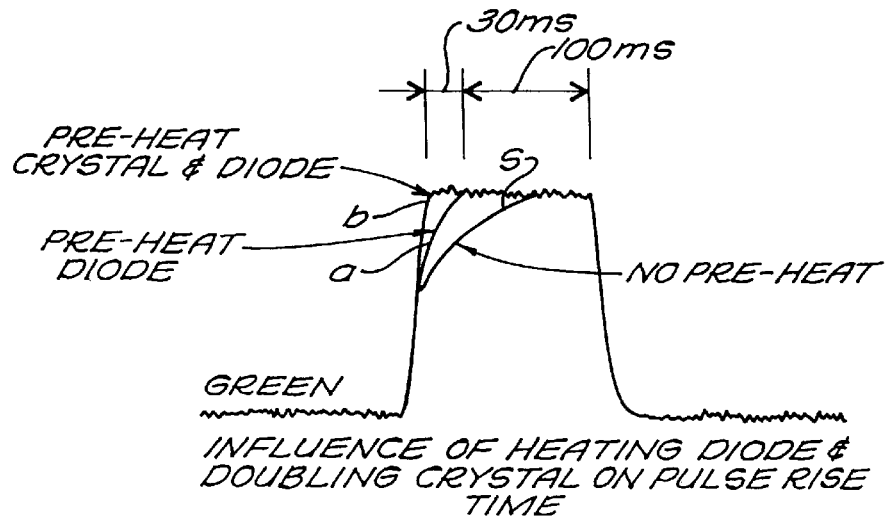
FIG. 5 shows the efficiency improvement during pulsed diode operation obtained by preheating the diode (curve a) and by pre-heating both the crystal and the diode (curve b)
Figure 6A:
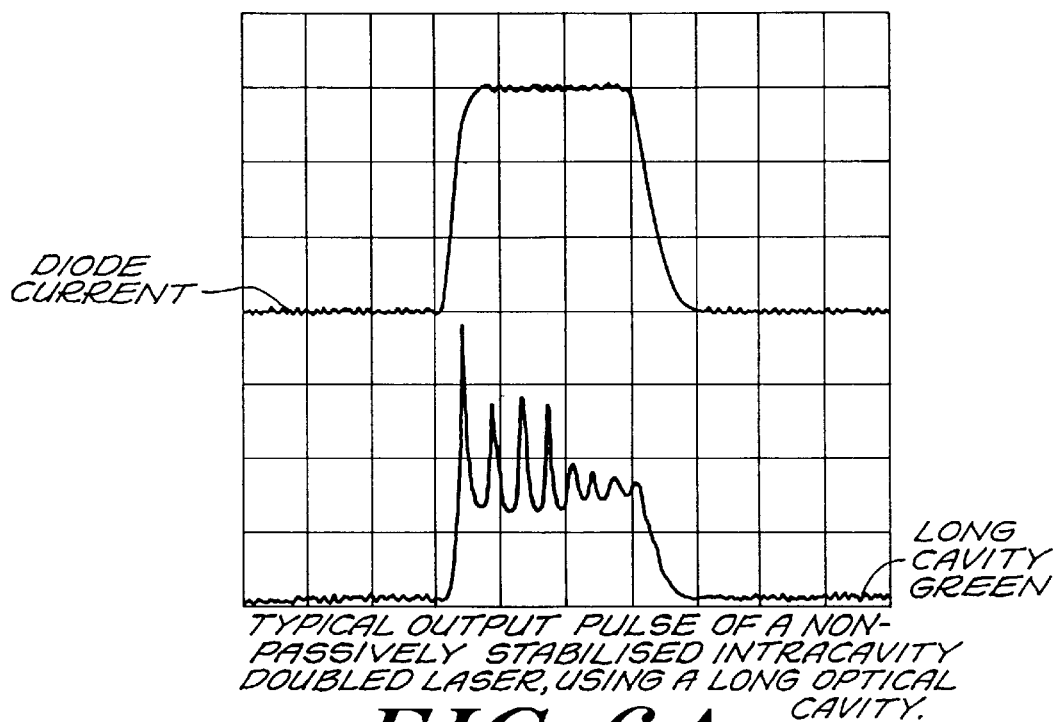
FIG. 6A shows the relationship of green output power to diode drive current for a pumped doubler in a long optical cavity.

FIG. 5 illustrates this in more detail, together with the improved output so obtained. As shown, when an essentially square 130 ms drive current pulse is applied to the pump diode, the output green power initially achieves a relatively low magnitude, and rises slowly over the first 30–60 ms to its steady level along a shoulder S. This ramp-up behavior arises both from the changing characteristics of the diode and the doubler. As shown in curve a of FIG. 5, by preheating the diode source, transient behavior of the diode is reduced and the green output is made to rise more abruptly, more accurately tracking the applied pulse signal. By also preheating the doubling crystal, the doubling efficiency of this initial pulse edge is further enhanced, as indicated by curve b in the FIGURE, to yield a green output of a shape identical to the applied drive signal. In preferred embodiments of the invention, this enhanced operation is achieved by providing a thermal control system which preconditions one or more of the diode, the non-linear element, and optionally the laser crystal prior to application of a drive signal, and preferably by an amount which depends on the intended pulse regimen. The thermal control system may include a sink, a heater or both, and control elements for actuating these elements in a sequence to pre-heat the laser diode and/or the doubling crystal. In prototype embodiments applicant has shown that by mounting a heater in contact with the doubling crystal to maintain temperature within a relatively loose tolerance of ±5° C. over the full range of expected duty cycles, a consistent level of pulsed output doubled power is achieved, whether the applied pulse regimen is a single shot, repetitive shots, or even CW.

The action of the crystal heater is complicated by the fact that the heat source responsible for elevation of crystal temperature resides within the crystal; in order to replicate CW temperature conditions in pulsed mode applicant set out to replicate the gradients within the crystal throught the application of thermal sources, heating and cooling, applied on the outside. A further constraint arises since the crystal must be heat sunk so as to prevent excessive temperature rise, but at the same time must be sufficiently moveable to be optically aligned.

In accordance with one preferred construction for heat sinking the doubler, applicant employs a nonlinear crystals such as KTP, LBO and BBO which is alignment sensitive in one direction. In the case of KTP for example, the X-Z tuning angle (theta) is 90°; the phase matching is so called "non-critical"-crystal phase matching in the X-Y plane (phi) and the crystal's doubling efficiency is most sensitive only in this plane. The crystal can therefore be mounted with alignment only in the horizontal direction, with clamping action after alignment to ensure good heat sinking, provided the crystal is oriented with the X-Y plane in the horizontal direction. When so clamped between heater/sink elements, the thermal gradient is the in the vertical direction, which is non-critically phase-matched and therefore insensitive to alignment and temperature variations. In this arrangement the crystal can be heated from the top and cooled from the bottom, while the temperature in the center through which the laser beam propagates can be controlled to be substantially homogeneous. By maintaining small physical size of the crystals, the transient response times can be kept relatively short and the absolute temperature changes relatively low.

In this aspect, the invention provides a means for not only maintaining temperatures at critical points but for producing and maintaining critical temperature gradients during a transition from heating supplied externally by electrically energized elements to heating originating in the crystal interior from absorption of laser light within the optical element. This is preferably done by mounting the critical non-linear element so that it is cooled from one direction and heated from the opposite direction in a manner to maintain the central temperature at at the desired value. The thermal energy supplied by the heater first sets up the desired gradient including a set absolute temperature in the center; the heater is then lowered or stopped when optical energy is applied to and absorbed in the crystal. The heater may then be re-energized so as to re-establish the original gradient between the optically active zone and the primary mount as the transients associated with pulsed laser operation diminish. Thus, the vertically-varying thermal gradient may be made to migrate across the actively illuminated stratum of the crystal. This operation allows the controller to maintain relatively stable thermal characteristics in a layer of the crystal over extended times as the pump laser is operated intermittently.

For enhancing the response of the diode to intermittent operation to achieve an output energy better reflecting the applied electrical pulses, applicant has pre-heated the diode, either through a "simmer" current pulse below laser threshold, or by simply elevating the temperature of the entire diode package above the optimum temperature for CW operation. This reduces the influence of chirp.

Figure 7A:
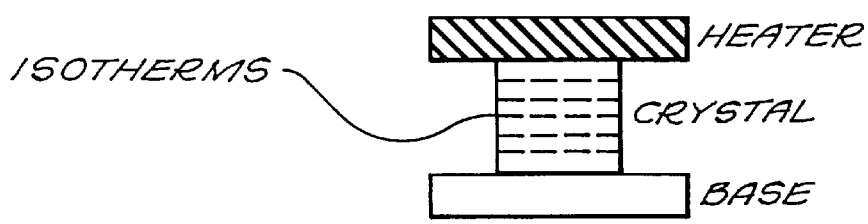
FIG. 7A shows a detail of another or further embodiment of the present invention having opposed thermal control elements.
Figure 7:
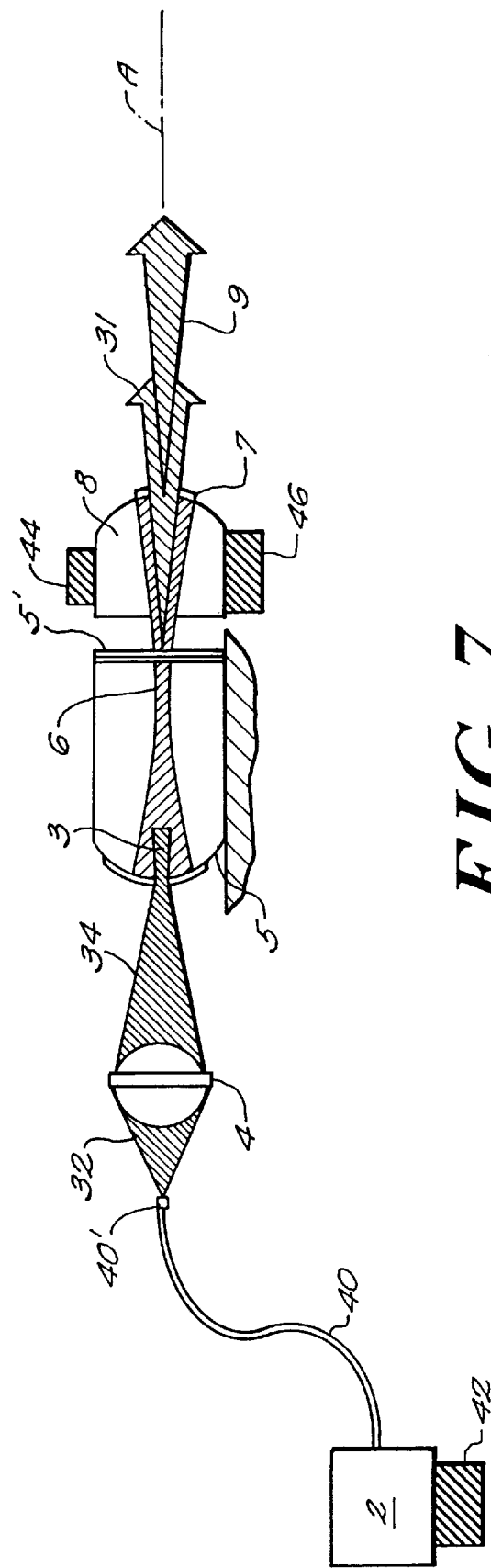
FIG. 7 shows another embodiment of the present invention having one or more thermal control elements.

FIG. 7 shows an end-pumped system of the present invention in an overall system layout similar to that of FIG. 1, with corresponding elements labelled identically thereto. In this embodiment, additional heat control preconditioners as described above are provided for both the LED diode pump source and the intracavity doubler. The diode heater 42 and the crystal heater 44 may be operated to maintain the respective diode source 2 and the doubler 8 at a temperature above ambient temperature. When the diode is to be energized, the controller reduces or entirely turns off power to the heater, so that the heat internally generated by laser actuation operates substantially to maintain the static the heat distribution already established in the crystal or diode by the heater element(s). For a given set of pulse power, duration and actuation times the heat flow and distribution may be readily modeled and the precise operation of the controller may be determined by techniques well known in control theory to achieve this effect. Thus for example, the controller may introduce lag, or apply a proportional heater current, or operate with a combination of lag, delay and proportional heater drive signals to assure that the operation of the device remains substantially isothermal during pulsed laser operation. As further shown in FIG. 7, a cooler or heat sink, such as a Peltier effect cooler or an air-cooled heat sink 46 is also provided in thermal contact with the non-linear crystal in some embodiments. This permits the small crystal to be quickly re-initialized following pulsed operation, or to establish steeper heat gradients or establish a desired thermal gradient more quickly. It also allows one, by operating the heater and cooler at different times, to establish an asymmetric thermal gradient, to establish a heat profile with a central dip or peak, and otherwise to set up the thermal environment of the doubler to more effectively complement the laser-induced heating and increase doubling efficiency. FIG. 7A ilustrates a vertical section through the nonlinear element, showing the isotherms created between the heater on the top and the cooler on the bottom. A temperature plot at the right illustrates the temperature at each stratum when a uniform gradient is initially established. As noted above the central value may be selected so that the active doubling volume resides at the desired operating temperature due to pulsed heat generation once the heater itself is switched OFF, and operation of the cooler may cause the induced heat to selectively migrate down, so that the pre-pulse condition is quickly re-established for the next actuation.

Figure 8A:
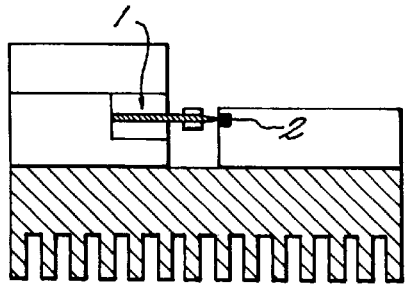
FIGS. 8A–8D show a scalable side-pumped architecture in which these thermal control elements have been fitted.
Figure 8B:
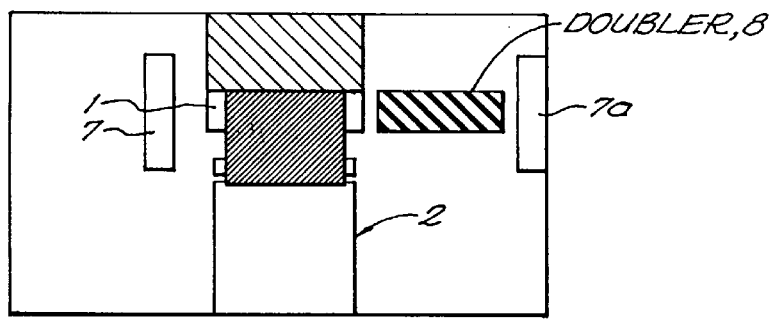
Figure 8C:
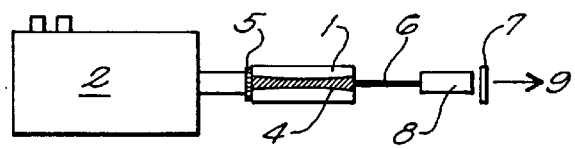
Figure 8D:
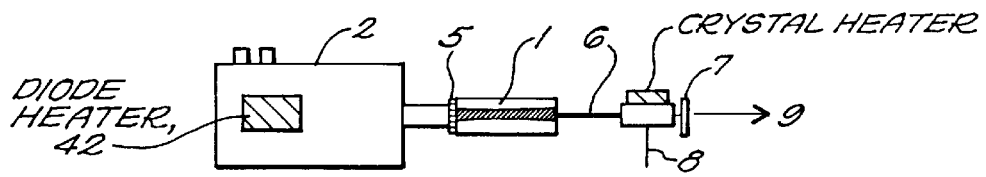

In addition to end-pumped configurations as shown in FIGS. 1 and 7, the stabilization of the present invention applies to side-pumped architectures. FIGS. 8A–8B show a scalable side-pumped architecture in which thermal control elements have been fitted. FIG. 8A is an end view showing the laser crystal 1 mounted between two blocks on a common base or heat source/sink and side pumped by a diode or line of diodes 2. FIG. 8B shows a top view of that embodiment, illustrating the intracavity placement of the crystal 1 and non-linears element 8 between the cavity-defining mirrors 7, 7A. FIGS. 8C and 8D illustrate another construction wherein a diode array 2 produces its output at a fiber stub to pump a laser 1 and doubling crystal 8 as shown, for example in FIG. 15 of applicant's earlier U.S. patent application entitled FIBER STUB END-PUMPED LASER. In this construction, the pump diode and the doubling crystal 8 are each fitted with a heater. The invention also contemplates the use of an active cooling device, such as a Peltier cooler to stabilize operation, as appears in FIG. 8A above, where cooler 7 operates to apply an appropriate heat profile to one or more elements of the system.

The invention being thus disclosed and representative embodiments thereof described, further variations and modifications will occur to those skilled in the art, and such variations and modifications are considered to be within the scope of the invention, as dfined by the claims appended hereto.

What is claimed is:

1. A solid-state laser comprising a main solid-state laser capable of being end pumped into a lasing mode and produce fundamental laser light a diode array formed of pump light emitting semiconductor diode lasers arranged to direct their pump light onto an end of the solid state laser for enhanced absorption of the pump light in the solid state laser and stimulated emission of a beam of fundamental laser light therefrom a pulsed driver for pulsing the diode array, and a nonlinear element which effects greater non linear conversion of the fundamental laser light when the fundamental laser light is unstable or spiking, said nonlinear element being positioned with said solid state laser in a laser cavity configured to inhibit spiking as said diode array is pulsed by said driver and thereby produce a converted output of stable power as said driver pulses the diode array.

2. A solid state laser according to claim 1, wherein said non-linear element is a frequency doubling crystal having a non-critical direction, and wherein said crystal is aligned with said main solid state laser in a plane transverse to said direction, and clamped to a heat control element in said direction.

3. A solid state laser according to claim 2, wherein said heat control element applies a thermal difference to create isotherms in said plane.

4. A solid state laser according to claim 2, wherein said heat control element applies a thermal difference in coordination with a selected pulse regimen to thermally condition the nonlinear element before it is illuminated with the fundamental light.

5. A solid state laser according to claim 4, wherein said heat control element applies a thermal difference in coordination with a selected pulse regimen to thermally condition the nonlinear element as it is illuminated with the fundamental light.

6. A solid state laser according to claim 4, wherein said solid state laser is a medical laser system and said pulsed driver produces pulses effective for ophthalmic applications having a pulse duration over approximately ten milliseconds.

7. A solid state laser according to claim 6, further including means for preheating the diode array by an amount effective the sharpen its output during an initial turn on interval.

8. A solid state laser according to claim 4, wherein said solid state laser is a medical dermatology laser system and said pulsed driver produces pulses effective for coagulation having a pulse duration under approximately ten milliseconds.

9. A solid state laser according to claim 4, wherein said solid state laser is an industrial laser system and said pulsed driver produces pulses effective for precise marking or cutting ablation.

10. A solid state laser according to claim 2, wherein said heat control element applies a thermal difference in coordination with a selected pulse regimen to thermally condition at least one of the diode array and the nonlinear element prior to application of the pulse regimen, and thereafter maintain a desired temperature range for operation during a successive pulse regimen.

11. A solid-state laser system comprising
a main solid-state laser capable of being pumped into a lasing mode to emit a fundamental laser light beam
an array of pump light emitting semiconductor diode lasers arranged to direct their pump light into the solid state laser
a pulse controller for pulsing the diode array, and
an intracavity nonlinear element which produces greater nonlinear conversion of the fundamental laser light when the fundamental laser light is unstable or spiking, wherein the main solid state laser and the nonlinear element reside in a laser cavity that is sufficiently short to stabilize converted output light as said array of semiconducting diode lasers is pulsed.

12. The solid-state laser system of claim 11, wherein the pulse controller provides pulse sequences having a characteristic duration of below approximately one millisecond to about ten milliseconds and the system is a medical dermatology system.

13. The solid-state laser system of claim 12, wherein the diode light is manipulated by micro-optics so as to form a single pump spot rather than an extended spot.

14. The solid state laser system of claim 12, wherein the nonlinear element is heated.

15. The solid state laser system of claim 12, wherein the laser output is monitored by a detector and output of the detector to provide a feedback adjustment of diode power and control the laser output.

16. The solid state laser system of claim 12, wherein
the fundamental laser operates on a plurality of laser lines, and
the nonlinear crystal mixes the lasing lines to produce wavelength-shifted output.

17. The solid state laser system of claim 12, wherein at least one of
pulse rate or amplitude of the laser diode is modulated to prevent stable operation, and thereby increasing the wavelength converted output of the nonlinear crystal.

18. The solid-state laser system of claim 12, wherein the diode light is directed into the TEMoo mode volume of the solid state laser.

19. A laser, comprising:
a high reflector and an output coupler defining a resonator cavity;
a gain medium positioned in the resonator cavity;
a diode pump source producing a pulsed pump beam incident on the gain medium to provide a fundamental wavelength beam; and
a diode pump source controller coupled to the diode pump source to produce power on demand, the controller receives an input of requested laser output power and pulse length, selects and sends a current pulse to the diode pump source in response to the input such that the diode pump source produces a pump beam of an amplitude and duration suitable generate the power on demand.

20. The laser of claim 19, wherein a duty cycle of the pump source is less than 100%.

21. The laser of claim 19, wherein the laser is portable.

22. The laser of claim 19, wherein the laser has a compact size.

23. The laser of claim 19, wherein the laser is air cooled.

* * * * *